United States Patent
Girmonsky et al.

(10) Patent No.: US 10,250,483 B2
(45) Date of Patent: Apr. 2, 2019

(54) SYSTEM AND METHOD THEREOF FOR DYNAMICALLY TESTING NETWORKED TARGET SYSTEMS THROUGH SIMULATION BY A MOBILE DEVICE

(71) Applicant: CA, Inc., Islandia, NY (US)

(72) Inventors: Alon Girmonsky, Tel Aviv (IL); Alex Haiut, Kfar Saba (IL)

(73) Assignee: CA, Inc., Islandia, NY (US)

( * ) Notice: Subject to any disclaimer, the term of this patent is extended or adjusted under 35 U.S.C. 154(b) by 457 days.

(21) Appl. No.: 14/748,415

(22) Filed: Jun. 24, 2015

(65) Prior Publication Data

US 2015/0381467 A1    Dec. 31, 2015

Related U.S. Application Data (60) Provisional application No. 62/016,677, filed on Jun. 25, 2014.

(51) Int. Cl.
| | |
|---|---|
| G06F 15/173 | (2006.01) |
| H04L 12/26 | (2006.01) |
| H04W 24/06 | (2009.01) |

(52) U.S. Cl.
CPC .......... H04L 43/50 (2013.01); H04L 43/065 (2013.01); *H04L 43/0817* (2013.01); *H04W 24/06* (2013.01)

(58) Field of Classification Search
None
See application file for complete search history.

(56) References Cited

U.S. PATENT DOCUMENTS

| | | | |
|---|---|---|---|
| 5,218,605 A | | 6/1993 | Low et al. |
| 6,157,940 A | * | 12/2000 | Marullo ............ G06F 9/52 703/27 |
| 6,249,886 B1 | * | 6/2001 | Kalkunte ............ G06F 11/3414 714/39 |
| 6,546,513 B1 | | 4/2003 | Wilcox et al. |
| 7,840,851 B2 | | 11/2010 | Hayutin |
| 7,844,036 B2 | | 11/2010 | Gardner et al. |
| 8,060,791 B2 | | 11/2011 | Hayutin |
| 8,239,831 B2 | | 8/2012 | Brennan et al. |
| 8,306,195 B2 | | 11/2012 | Gardner et al. |
| 8,311,776 B2 | * | 11/2012 | Blackledge ......... H04L 43/0888 324/762.01 |
| 8,341,462 B2 | | 12/2012 | Broda et al. |

(Continued)

*Primary Examiner* — Phyllis A Book
(74) *Attorney, Agent, or Firm* — Pillsbury Winthrop Shaw Pittman LLP (57) ABSTRACT

A method and system for dynamically testing a networked target system (NTS) through simulation by a mobile device. The method comprises: receiving at least one test specification designating at least a type of the test and a number of step repeater devices (SRDs) required for the test; receiving, from the mobile device, a request to establish a secure connection; establishing the secure connection with the mobile device by impersonating the NTS; capturing each step performed by a user of the mobile device on an application installed thereon, wherein the application operates in conjunction with the NTS; setting all SRDs designated in the test specification with each captured step, thereby causing the SRDs to perform the captured step; receiving, from the SRDs, information respective of performance of the NTS; and generating a performance testing report based on the received information.

20 Claims, 5 Drawing Sheets

(56) References Cited

U.S. PATENT DOCUMENTS

| | | | |
|---|---|---|---|
| 8,510,600 B2 | 8/2013 | Broda et al. | |
| 9,021,362 B2 | 4/2015 | Broda et al. | |
| 9,122,789 B1* | 9/2015 | Massa | G06F 11/3612 |
| 9,417,849 B2* | 8/2016 | Capuozzo | G06F 8/00 |
| 2003/0110421 A1* | 6/2003 | Kurinami | G06F 11/3428 |
| | | | 714/47.1 |
| 2003/0182408 A1* | 9/2003 | Hu | G06F 11/3414 |
| | | | 709/223 |
| 2006/0168197 A1* | 7/2006 | Motoyama | H04L 43/065 |
| | | | 709/224 |
| 2008/0066009 A1 | 3/2008 | Gardner et al. | |
| 2009/0268713 A1* | 10/2009 | Ottur | H04L 43/00 |
| | | | 370/352 |
| 2010/0095160 A1* | 4/2010 | Dickens | H04L 43/50 |
| | | | 714/43 |
| 2010/0177896 A1* | 7/2010 | Walter | H04L 63/166 |
| | | | 380/270 |
| 2011/0066892 A1 | 3/2011 | Gardner et al. | |
| 2012/0017165 A1 | 1/2012 | Gardner et al. | |
| 2012/0246310 A1 | 9/2012 | Broda et al. | |
| 2012/0266231 A1* | 10/2012 | Spiers | H04L 63/0218 |
| | | | 726/12 |
| 2012/0309348 A1* | 12/2012 | De Atley | H04L 63/08 |
| | | | 455/410 |
| 2013/0097307 A1 | 4/2013 | Vazac et al. | |
| 2013/0111257 A1* | 5/2013 | Broda | G06F 9/5083 |
| | | | 714/2 |
| 2013/0346814 A1* | 12/2013 | Zadigian | G01R 31/28 |
| | | | 714/724 |
| 2014/0033055 A1 | 1/2014 | Gardner et al. | |
| 2014/0280880 A1 | 9/2014 | Tellis et al. | |
| 2015/0100679 A1* | 4/2015 | Chandaka | H04L 67/22 |
| | | | 709/224 |
| 2015/0121078 A1* | 4/2015 | Fu | G06F 21/30 |
| | | | 713/175 |
| 2015/0195182 A1* | 7/2015 | Mathur | H04L 43/50 |
| | | | 714/27 |
| 2015/0324182 A1* | 11/2015 | Barros | G06F 8/61 |
| | | | 717/174 |

* cited by examiner

SYSTEM AND METHOD THEREOF FOR DYNAMICALLY TESTING NETWORKED TARGET SYSTEMS THROUGH SIMULATION BY A MOBILE DEVICE

CROSS-REFERENCE TO RELATED APPLICATIONS

This application claims the benefit of U.S. provisional application No. 62/016,677 filed on Jun. 25, 2014, the contents of which are herein incorporated by reference.

TECHNICAL FIELD

This disclosure generally relates to systems for testing the performance of computer software applications, and more particularly to systems and methods for testing the functioning of networked systems in real-time.

BACKGROUND

The worldwide web offers real-time access to large amounts of data, enabling enterprises to provide information via widely accessible electronic communications networks in the form of a variety of computer programs. Such enterprises commonly spend a great deal of time and money testing the computer programs they develop in order to ascertain the programs' functionality and performance. In order to test the operation of the computer programs, performance tests are performed to determine a program's behavior under both normal and anticipated peak load conditions, troubleshoot performance problems, and provide unit tests on a daily basis to developed modules.

Current solutions for automated testing allow software developers or QA engineers to prepare testing scripts and run such scripts to test the software being developed. A testing script typically includes the following test parameters: an amount of networked devices to be used in the test, actions to be taken by the networked devices through the test, and the like. A networked device is a computing device commutatively connected to a network (e.g., the Internet) and configured to run the scripting test.

To test a remote server or a software application hosted by such a server (hereinafter "entity under-test"), networked devices are configured to execute the script tests. Throughout the execution of the test scripts, the performance of the entity under-test is monitored. Upon identification of an event which requires additional testing parameters or tuning of the already existing parameters, the test must be terminated and a new test script that includes the new and/or tuned testing parameters is programmed and executed. Thus, existing script-based testing solutions are static as the additional required parameters can only be added upon termination of the executed script.

In addition, in most cases, new testing scripts must be loaded to the networked devices. This cycle of terminating, programming, loading, and re-executing test scripts is a waste of computational resources, time, and money. For example, testing a new software application using the conventional automated testing techniques would delay the launch or deployment of the new software application.

Furthermore, more and more software applications (apps) are executed by mobile devices, such as smartphones and tablet computers. The execution of such applications is distributed between the mobile device (frontend) and a server (backend). The backend processes requests received from all mobile devices co-currently running the applications. To test the performance of the backend server would require simulating the operation of the mobile devices. In addition to the disadvantages of utilizing script-based testing, there are security challenges that should be overcome when testing applications executed by mobile devices. Such challenges arise due to the fact that communication between mobile devices and backend servers are typically encrypted.

It would be therefore advantageous to provide an automated testing solution that would overcome the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Certain embodiments disclosed herein include a method for dynamically testing a networked target system (NTS) through simulation by a mobile device. The method comprises: receiving at least one test specification designating at least a type of the test and a number of step repeater devices (SRDs) required for the test; receiving, from the mobile device, a request to establish a secure connection; establishing the secure connection with the mobile device by impersonating the NTS; capturing each step performed by a user of the mobile device on an application installed thereon, wherein the application operates in conjunction with the NTS; setting all SRDs designated in the test specification with each captured step, thereby causing the SRDs to perform the captured step; receiving, from the SRDs, information respective of performance of the NTS; and generating a performance testing report based on the received information.

Certain embodiments disclosed herein include a system for dynamically testing a networked target system (NTS) through simulation by a mobile device. The system comprises: a processor; and a memory, the memory containing instructions that, when executed by the processor, configure the system to: receive at least one test specification designating at least a type of the test and a number of step repeater devices (SRDs) require for the test; receive, from the mobile device, a request to establish a secure connection; establish the secure connection with the mobile device by impersonating the NTS; capture each step performed by a user of the mobile device on an application installed thereon, wherein the application operates in conjunction with the NTS; set all SRDs designated in the test specification with each captured step, thereby causing the SRDs to perform the captured step; receive, from the SRDs, information respective of performance of the NTS; and generate a performance testing report based on the received information.

BRIEF DESCRIPTION OF THE DRAWINGS

The subject matter described herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

The embodiments disclosed herein are only examples of the many possible advantageous uses and implementations of the innovative teachings presented herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

By a way of example, according to some of the disclosed embodiments, a server receives a request from a mobile device to perform traffic simulation on a networked target system (NTS) as part of a performance testing procedure. The traffic simulation is a virtual performance modeling on network consumption, i.e., packets delivery, bandwidth consumption, etc., performed in order to predict a future live performance of the NTS.

According to an embodiment, the traffic simulation is respective of a sequence of steps of actions performed, in real-time, by a user of the mobile device on a software application installed on the mobile device. Such a user may be, for example, a software developer, a QA engineer, and the like. The server is further configured to capture the steps or actions and repeat these steps for execution by a plurality of testing machines. It should be noted that repeating the steps as they are being performed renders the dynamic testing as the test is not pre-coded using, for example, test scripts.

In order to capture the steps as performed by the mobile device, a secure connection is established between the mobile device and the server. In an embodiment, the secure connection is established by means of a trusted certificate. The embodiments disclosed will now be discussed in conjunction with the accompanying drawings.

Figure 1:
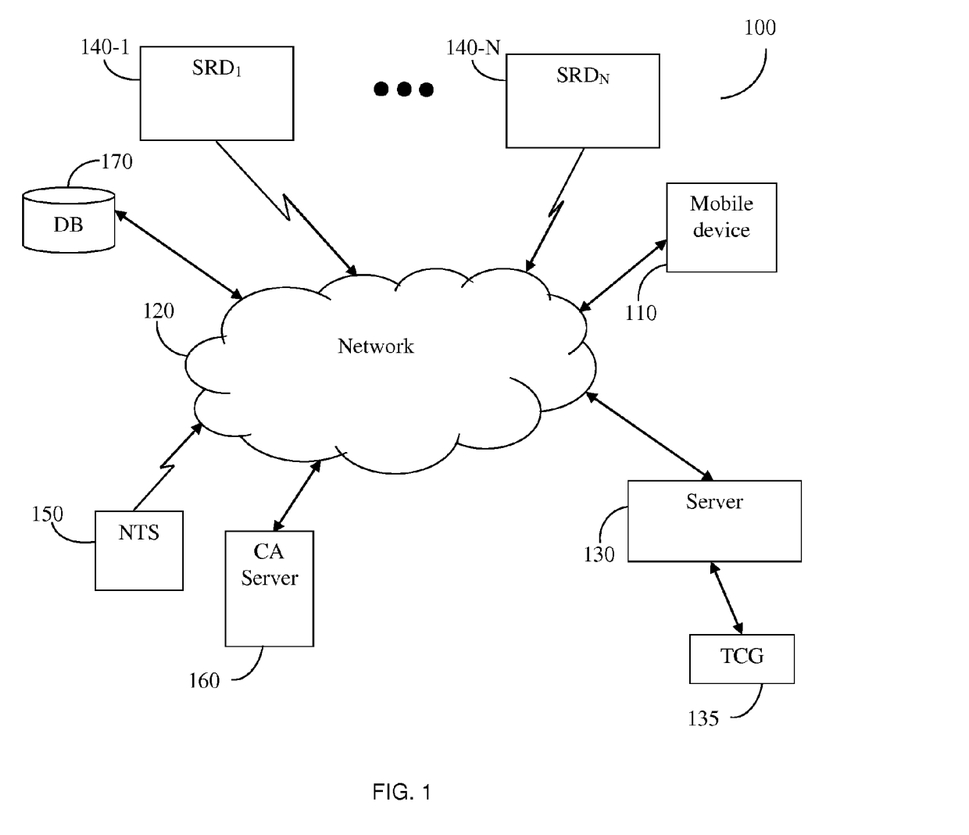
FIG. 1 is a schematic block diagram of a networked system utilized to describe the disclosed embodiments.

FIG. 1 depicts an exemplary and non-limiting diagram of a networked system 100 for dynamic and real-time performance testing of a networked target system (NTS) according to an embodiment. The system 100 includes a mobile device 110, a NTS 150, a plurality of step repeated devices (SRDs) 140-1 through 140-N, a certificate authority (CA) server 160, and a database 170 communicatively connected to a network 120. The network 120 may be a secured network, wireless, cellular or wired, a local area network (LAN), a wide area network (WAN), a metro area network (MAN), the Internet, the worldwide web (WWW), and any combination thereof. The network 120 may be a secured network in which communication with at least an NTS 150 is performed using a secured protocol, such as, secure sockets layer (SSL), transport layer security, and the like.

According to an embodiment, the NTS 150 is the entity under testing. In exemplary and non-limiting configurations, the NTS 150 is an application or web (backend) server that serves a mobile application (app) installed on the mobile devices 110. The mobile device 110 is utilized to simulate the operation of the installed mobile application. For example, a NTS 150 may be, but is not limited to, a web server of Amazon® and the mobile application would be an Amazon app allowed to make online purchases.

The disclosed embodiments would allow for traffic simulation, e.g., load performance, for accessing the NTS 150 from multiple devices through a sequences of steps performed by a user of the mobile device 110, for example, selecting an item, adding an item to a chat, replacing an item in a shopping cart, filling a billing form, and so on. The load performance on the web server during each such step can be tested.

The mobile device 110 is operated by a user who controls the execution of the automated testing of the NTS 150. The user of the mobile device 110 may be, for example, a software developer, a QA engineer, and the like. According to an embodiment, the mobile device 110 is configured to send requests and receive data to and from a server 130. The mobile device 110 may be, for example, a smart phone, a mobile phone, a tablet computer, a wearable computing device, and the like. Typically, the mobile device 110 is installed with a mobile operating system such as, for example, iOS®, Android®, and the like. The mobile device 110 communicates with the NTS 150 using a secure connection.

A trusted certificates generator (TCG) 135 is communicatively connected to the server 130. The TCG 135 is configured to generate trusted certificates in order to open a secure connection between the server 130 and the mobile device 110, such that the secure connection is established with the NTS 150. That is, the server 130 impersonates the NTS 150 using a trusted certificate generated by the TCG 135. In an exemplary embodiment, a trusted certificate may be, for example, a SSL certificate, a transport layer security (TLS) certificate, and the like. The TCG 135 may be integrated in the server 130.

The SRDs 140 are configured by the server 130 to simulate the operation of a plurality of user terminals (e.g., mobile devices 110) according to testing information. In various embodiments, the testing information may be provided by a user either directly or through the mobile device 110. Testing information may include one or more test specifications such as, but not limited to, the number of initial SRDs 140 to be used, the respective geographic locations of such SRDs 140, the type(s) of SRDs 140 to be used, and so on. The SRDs 140, in one embodiment, are implemented in a cloud-computing platform or executed by servers installed in a cloud-computing platform. The cloud-computing platform may be, for example, a private cloud system, a public cloud system, or a hybrid cloud system. Each SRD 140 may a physical appliance, a virtual appliance (e.g., a virtual machine), or combination thereof.

The SRDs 140 may be dynamically allocated or de-allocated to performing a specific test. The number of SRDs 140 may be changed any time during the test being performed, and such changes are controlled by the server 130. The SRDs 140 can also be activated or deactivated, by the server 130, any time during the test.

In an embodiment, testing information may be, but is not limited to, a file containing one or more test specifications.

In such embodiments, the user may be able to select a predetermined test specification rather than programming the test specification.

According to the disclosed embodiments, the server 130 is configured to receive a request, from the mobile device 110, to test the operation of the NTS 150. The request may include metadata detailing a test specification. The server 130 also receives a request, from the mobile device 110, to establish a secured connection with the NTS 150. In an embodiment, a trusted certificate is generated by the TCG 135. The trusted certificate may include a certificate of the NTS 150 as retrieved from the CA server 160. The mobile device 110 can verify that the certificate belongs to the NTS 150 through a certificate authority that approves the certificate. Upon verification of the certificate, the mobile device 110 can exchange a client key with the server 130 to inform that all subsequent communications are encrypted. At the completion of the handshake process between the server 130 and the mobile device 110, a secured connection is established.

Upon establishing a secured connection, the test of the NTS 150 begins. It should be noted the secure connection is between the server 130 and mobile device 110 in such a way that the server 130 impersonates the NTS 150. This is performed in order to allow the server 130 to capture steps performed by the mobile device 110 during the test.

Respective of the test specification, the server 130 is configured to allocate, activate, and/or instantiate SRDs 140 assigned to test the NTS 150. The number of SRDs 140 and their locations are as designated in the request. In an embodiment, the server 130 is configured to capture in real-time the steps performed by the mobile device 110 with respect to operating on the NTS 150 and provide each of the captured steps to the SRDs 140. Each SRD 140 will repeatedly perform a captured step. According to another embodiment, the steps performed by the mobile device 110 with respect to operating on the NTS 150 are captured and stored in the database 170 as a performance test scenario to be executed later on by the SRDs 140.

The server 130 then gathers information respective of the performance of the NTS 150 as executed by the SRDs 140. According to one embodiment, respective of the gathered information, the server 130 is configured to generate a performance testing report.

It should be noted that one mobile device 110 and one NTS 150 are depicted in FIG. 1 merely for the sake of simplicity. The embodiments disclosed herein can be applied to a plurality of mobile devices 110 and a plurality of NTSs 150.

The server 130 typically comprises a processing unit, such as a processor (not shown) that is coupled to a memory (not shown). The processing unit may include one or more processors. The one or more processors may be implemented with any combination of general-purpose microprocessors, multi-core processors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing unit may be coupled to the memory. In an embodiment, the memory contains instructions that when executed by the processing unit results in the performance of the methods and processes described herein below. Specifically, the processing unit may include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing unit to perform the various functions described herein.

Figure 2:
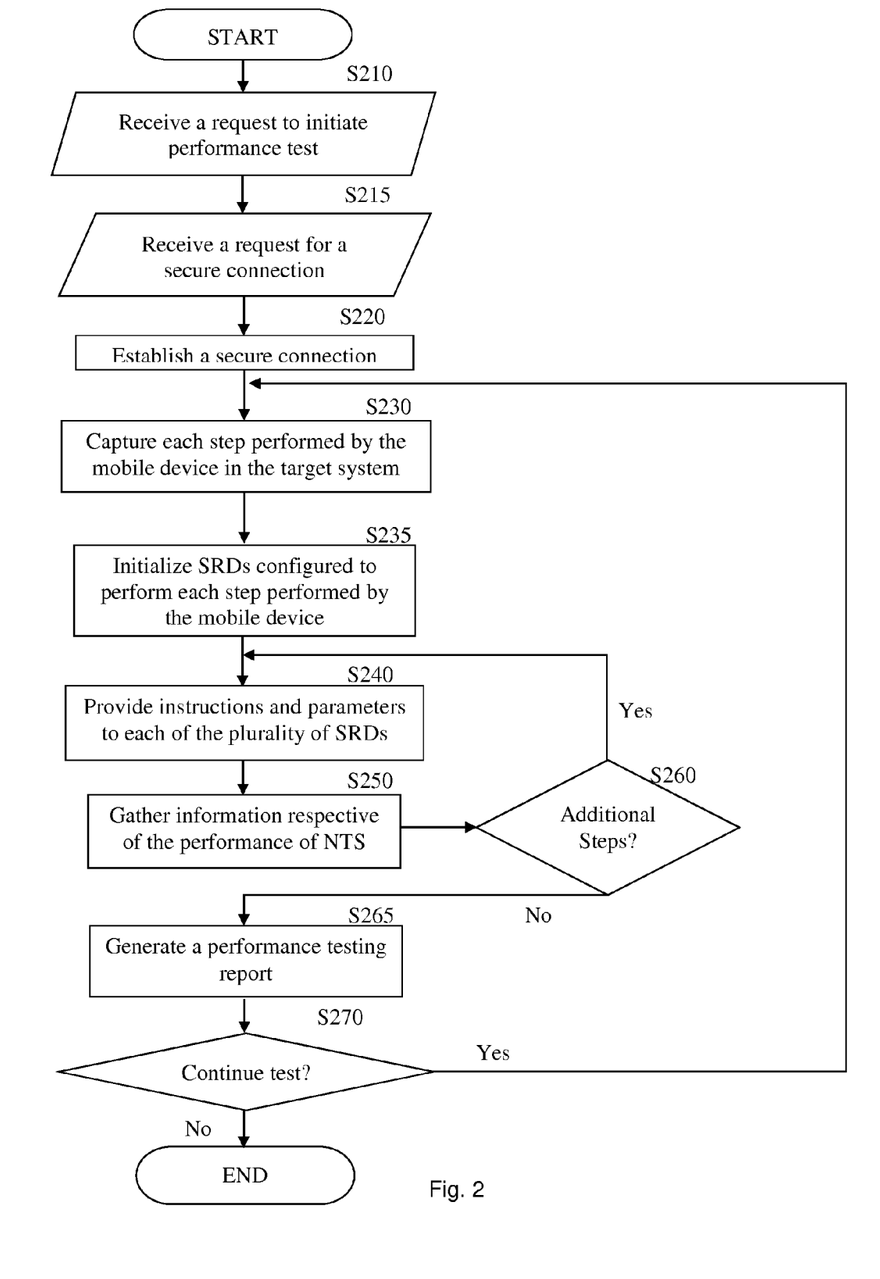
FIG. 2 is a flowchart describing a method for dynamically testing a networked target system (NTS) through simulation by a mobile device according to one embodiment.

FIG. 2 depicts an exemplary and non-limiting flowchart 200 describing a method for performance testing of a NTS in accordance with an embodiment. The method is performed by a server controlling the test, e.g., the server 130. In S210, a request to initiate a performance test of at least one NTS (e.g., the NTS 150) and respective testing information is received from a mobile device (e.g., the mobile device 110). The testing information includes at least one test specification discussed in detail above.

In S215, a request to establish a secured connection with the NTS 150 is received from the mobile device 110. In a response, in S220, a secured connection is established with the server 130, thereby impersonating the NTS 150. The process of establishing the secure connection is discussed in greater detail in FIG. 4. It should be noted the method continues only once the secure connection has been successfully established.

In S230, each step performed by a user of the mobile device 110 (on an application being tested) is captured. In an embodiment, the steps being performed are determined based on requests generated by the application being tested and are intercepted by the server 130.

In S235, an initial number of SRDs are initialized, allocated, or otherwise instantiated based on the test specification. In S240, each of the initial SRDs are provided with instructions and parameters according to the captured steps. As a result, the SRDs will perform the captured steps on the NTS 150. For example, all the SRDs will perform an action of adding an item to a cart. Requests generated from such steps are sent to the NTS 150. Operation of SRDs is discussed further herein below with respect to FIG. 5.

In S250, information respective of the performance of the NTS 150 is gathered. In S260, it is checked whether additional steps made by the mobile device 110 have yet to be repeated and if so, execution continues with S240; otherwise, execution continues with S265. In S265, a performance testing report is generated respective of the gathered information. The performance testing report may include, but is not limited to, estimated maximum capacity, errors received during testing, throughput of the NTS 150, response time, and so on. In S270, it is checked whether additional testing is requested and if so, execution continues with S230; otherwise, execution terminates.

As a non-limiting example, a request to initiate a performance test of a NTS and testing information is received. In this example, the NTS being tested is an e-commerce website which allows users to order books online. The access to the e-commerce website is through a mobile application (app). The testing information indicates that 10,000 SRDs from the same geographic location will be utilized for the test. The NTS is a web server hosting the e-commerce website.

A user of the mobile device performs several steps on the mobile application, including selecting a book, adding a book to an electronic shopping cart, and initiating a payment. The NTS typically performs such steps over an SSL connection. Therefore, an SSL connection is established between the server and the mobile device to simulate the operation of the NTS.

The shopping steps performed by a user of the mobile device are captured and provided to the SRDs. Each SRD repeats the steps provided to it, thereby simulating 10,000 more users of the e-commerce website performing these actions. Information related to the simulation is gathered and assembled to generate a performance testing report.

Figure 3:
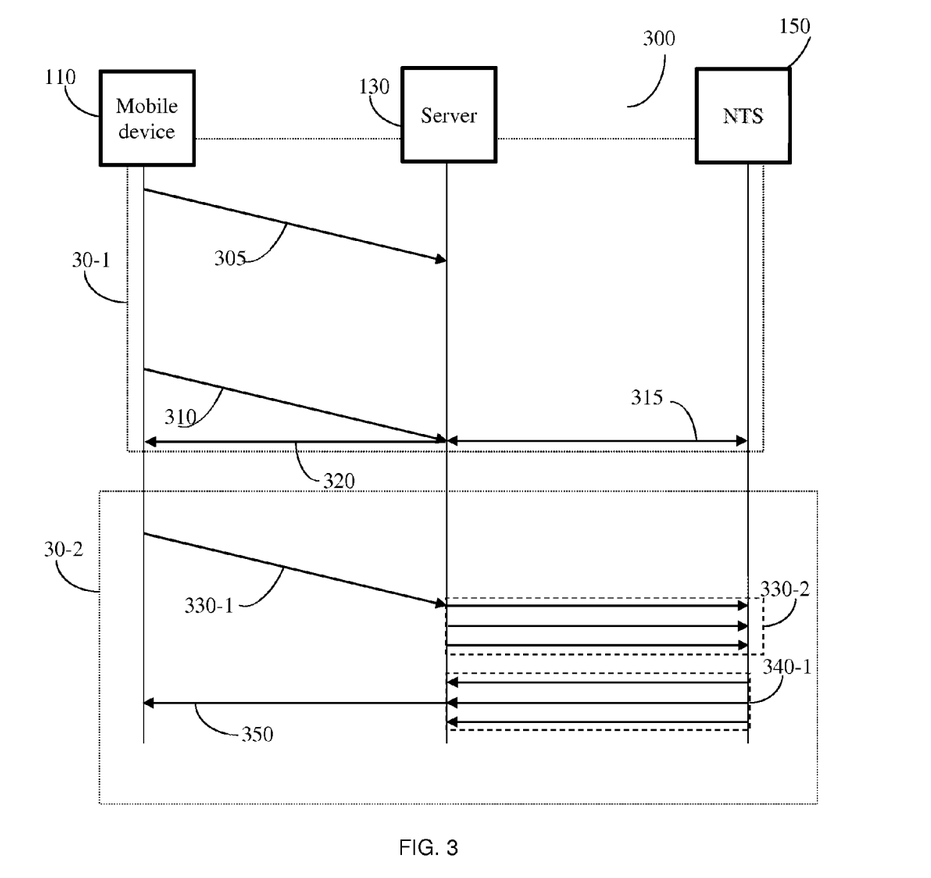
FIG. 3 is a schematic communication diagram describing the various disclosed embodiments.

FIG. 3 depicts an exemplary and non-limiting schematic communication diagram 300 describing a method for dynamically testing a NTS 150 through simulation by a mobile device in accordance with an embodiment. The schematic diagram 300 describes an initialization cycle 30-1 and a testing cycle 30-2 which include capturing of steps performed by the mobile device 110 and performing the steps with the plurality of SRDs 140.

In the initialization cycle 30-1, the server 130 receives a request 305 from the mobile device 110 to initiate a performance test of the NTS 150. The server 130 further receives an initial request 310 for establishing a secured connection with the NTS 150. In response, the server 130 then fetches 315 a certificate of the NTS 150. The server generates (using the TCG 135) a trusted certificate (32) using the certificate of the NTS 150. Finally, the server 130 sends the trusted certificate 320 to the mobile device 110.

In the testing cycle 30-2, a step 330-1 is performed by the mobile device 110 with respect of the NTS 150. Respective of the step 330-1, a number of SRDs 140 are initialized to perform the same step(s) 330-1 as the step 330-2. Respective of the step 330-2, responses 340-1 are sent by the NTS 150 to the mobile device 110 to the server 130 which gathers information respective of the system based on the response(s) 330-1. Respective of the gathered information, the server 130 generates a performance testing report 350 and sends the report 350 to the mobile device 110.

Figure 4:
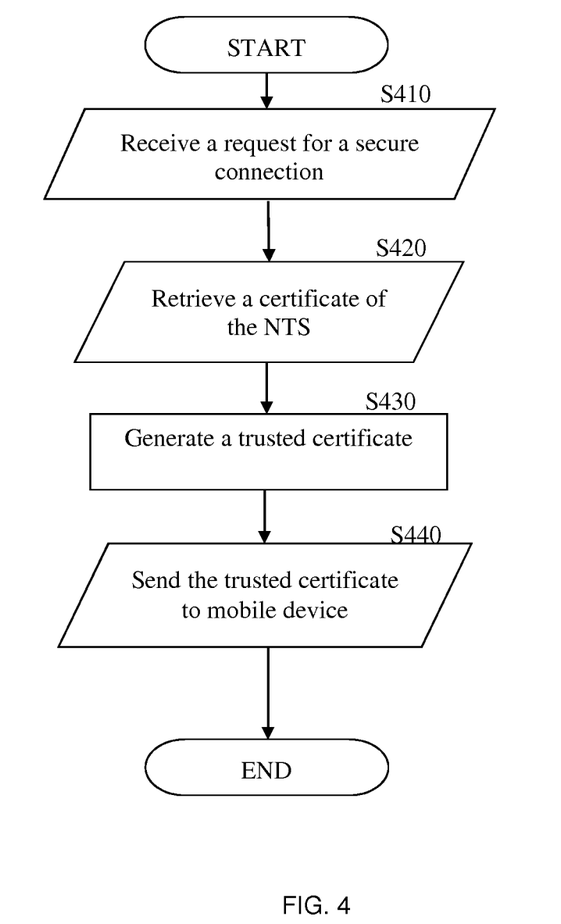
FIG. 4 is a flowchart describing a process for establishing a secure connection according to one embodiment.

FIG. 4 depicts an exemplary and non-limiting flowchart S220 describing a process for establishing a secure connection with a mobile device for the purpose of test performing the NTS according to an embodiment. The method is performed by a server controlling the test, e.g., the server 130.

In S410, a request for a secure connection from the mobile device is received. The request designates at least cryptographic systems and/or protocols that the mobile device can support.

In S420, a certificate is retrieved from a CA server (e.g., CA server 160). The certificate is of the NTS 150. That is, the server 130 impersonates the NTS 150 by using a certificate with an identity related to the NTS 150. In S430, a trusted certificate is generated. In an exemplary embodiment, the trusted certificate contains a certificate of the NTS 150 and the cryptographic system and/or protocol chosen by the server.

In S440, the generated trusted certificate is sent to the mobile device. The mobile device can verify the certificate belongs to the server through a certificate authority that approves the certificate. Upon verification of the certificate, the mobile device can exchange a client key with the server 130 to inform that all subsequent communications are encrypted. At the completion of the handshake process between the server and the mobile device, a secured connection is established.

Figure 5:
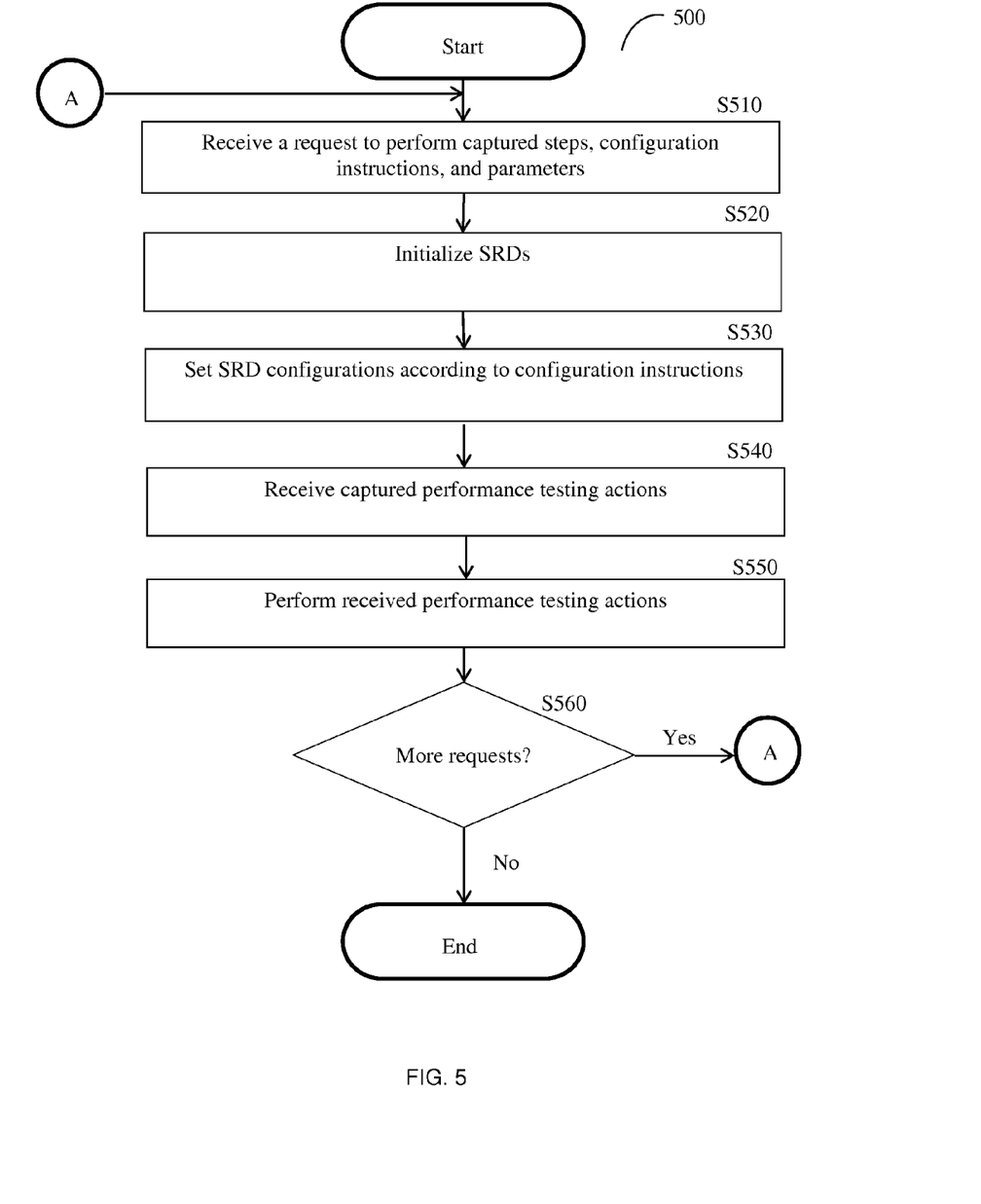
FIG. 5 is a flowchart illustrating operation of a step repeater device (SRD) according to one embodiment.

FIG. 5 is an exemplary and non-limiting flowchart 500 illustrating an operation of step repeater devices (SRDs, e.g., SRDs 140) according to an embodiment. In S510, a request to perform captured performance testing steps, configuration instructions, and parameters are received. In an embodiment, such a request and instructions may be received from a server (e.g., server 130). In another embodiment, configuration instructions may be retrieved from, e.g., a storage device. Captured performance testing steps include all steps provided by, e.g., a mobile device 110, such that, when performed by the SRDs 140, all actions originally provided by the user terminal are repeated by SRDs 140. Configuration instructions are typically determined based on testing information provided respective of the testing to be performed, and may include, but are not limited to, which SRDs 140 to initialize, which actions to be repeated by each SRD 140, and so on.

Responsive to the request, in S520, the SRDs 140 are initialized. In S530, the configuration of each SRD 140 is set according to the received configuration instructions and parameters. In an embodiment, each SRD 140 may receive different configuration instructions and parameters. In order to test a response time of a website when accessed, a configuration instruction may be sending a hypertext transfer protocol (HTTP) request and the configuration parameter may be a URL of the website. The SRD 140 will measure the time elapsed until an HTTP response has been received from the website. The measured time is reported to the server 130. The SRD 140 can repeat that action at predefined time intervals.

In S540, the captured performance testing actions are received. Such captured actions may be received from, e.g., a server, a mobile device, a storage device, and so on. In S550, the received performance testing actions are performed. In S560, it is checked whether additional requests to perform captured actions have been received and, if so, execution continues with S510; otherwise, execution terminates.

The various embodiments may be implemented as hardware, firmware, software, or any combination thereof. Moreover, the software is preferably implemented as an application program tangibly embodied on a program storage unit or tangible computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. All or some of the servers maybe combined into one or more integrated servers. Furthermore, a non-transitory computer readable medium is any computer readable medium except for a transitory propagating signal. The display segments and mini-display segments may be shown on a display area that can be a browser or another other appropriate graphical user interface of an internet mobile application, either generic or tailored for the purposes described in detail hereinabove.

All examples and conditional language recited herein are intended for pedagogical purposes to aid the reader in understanding the principles and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method, comprising:
   receiving, from a mobile device by a server system not under test, at least one test specification designating at least a type of test and a number of step repeater devices (SRDs) required for the test;
   receiving, from the mobile device by the server system, a request to establish a secure connection;
   in response to the request to establish the secure connection, transmitting, to the mobile device by the server system, a trusted certificate corresponding to a networked target system (NTS) to impersonate the NTS;
   establishing by the server system, the secure connection with the mobile device, wherein the secure connection is established after verification of the certificate by the mobile device;
   capturing, by the server system, a sequence of requests over the secure connection, wherein the requests originate from the mobile device and correspond to user actions performed by a user of an application on the mobile device, the application being configured to operate in conjunction with the NTS;
   determining, by the server system, a sequence of captured steps that were performed within the application based on the sequence of requests;
   configuring, by the server system, all SRDs designated in the test specification with each captured step, thereby causing each of the SRDs to perform the sequence of captured steps by transmitting one or more requests to the NTS; and
   receiving, from the SRDs, information about the performance of the NTS.

2. The method of claim 1, wherein the test specification further comprises at least one of: at least one geographic location of SRDs to be used, at least one type of SRDs to be used, and at least one action to be repeated by the SRDs.

3. The method of claim 2, wherein the SRDs are dynamically configured with each captured step, the method further comprising:
   determining a first captured step in the sequence of captured steps in response to receiving a first request in the sequence of requests; and
   configuring, in response to determining the first captured step, the SRDs with the first captured step, thereby causing each of the SRDs to perform the first captured step by transmitting a request to the NTS,
      wherein a next captured step in the sequence of captured steps is unknown prior to receiving at least one next request in the sequence of requests and the SRDs are configured to perform at least some captured steps prior to receiving the at least one next request.

4. The method of claim 1, wherein establishing the secure connection further comprises:
   obtaining a certificate of the NTS; and
   wherein the trusted certificate includes at least the obtained certificate of the NTS and a cryptographic system to communicate with the mobile device over the secure connection.

5. The method of claim 4, wherein the secure connection comprises a transport layer security (TLS) connection.

6. The method of claim 1, wherein the NTS comprises any one of: a web server and an application server.

7. The method of claim 1, wherein at least one of the group consisting of the NTS and at least one of the SRDs is partially or completely deployed in a cloud-computing platform, wherein the cloud-computing platform is at least one of: a public cloud system, a private cloud system, and a hybrid cloud system.

8. The method of claim 1, wherein receiving information about the performance of the NTS further comprises generating a performance testing report based on the received information.

9. The method of claim 8, wherein the performance testing report comprises:
   an estimated maximum capacity;
   if at least one error was received during testing, the at least one error received during testing;
   throughput of the NTS; and
   a response time of the NTS.

10. The method of claim 1, wherein:
    the sequence of captured steps comprise: selecting an item, adding an item to a shopping cart, replacing an item in the shopping cart, or filling a billing form, each in the application on the mobile device;
    configuring all SRDs comprises configuring 10,000 SRDs in a geographic location designated by the test specification;
    the server system controls the test and impersonates the NTS when configuring the test with the mobile device but is not part of the NTS; and
    the information about the performance of the NTS comprises information about elapsed time until responses are received by SRDs after a requests to the NTS.

11. A non-transitory computer readable medium having stored thereon instructions for causing one or more processing units of the server system to execute the computerized method according to claim 1.

12. A system, comprising:
    one or more computers configured to implement a server system and that comprises memory storing instructions that, when executed, effectuate operations comprising:
    receive, from a mobile device, at least one test specification designating at least a type of test and a number of step repeater devices (SRDs) require for the test, the test being configured for testing a networked target system (NTS) through simulation of mobile devices, and the test not being a test of the server system;
    receive, from the mobile device, a request to establish a secure connection;
    transmit, to the mobile device, a trusted certificate corresponding to the NTS to impersonate the NTS in response to the request to establish the secure connection;
    establish the secure connection with the mobile device, wherein the secure connection is established after verification of the certificate by the mobile device;
    capture a sequence of requests over the secure connection, where the requests originate from the mobile device and correspond to user actions performed by a user of an application on the mobile device, the application being configured to operate in conjunction with the NTS;
    determine a sequence of captured steps that were performed within the application based on the sequence of requests;
    configure all SRDs designated in the test specification with each captured step, thereby causing each of the SRDs to perform the sequence of captured steps by transmitting one or more requests to the NTS; and receive, from the SRDs, information about the performance of the NTS.

13. The system of claim 12, wherein the test specification further comprises at least one of: at least one geographic location of SRDs to be used, at least one type of SRDs to be used, and at least one actions to be repeated by the SRDs.

14. The system of claim 13, wherein the SRDs are dynamically configured with each captured step, and wherein the operations of the server system comprise:

determine a first captured step in the sequence of captured steps in response to receiving a first request in the sequence of requests; and configure, in response to determining the first captured step, the SRDs with the first captured step, thereby causing each of the SRDs to perform the first captured step by transmitting a request to the NTS, wherein a next captured step in the sequence of captured steps is unknown prior to receiving at least one next request in the sequence of requests and the SRDs are configured to perform at least some captured steps prior to receiving the at least one next request.

15. The system of claim 13, wherein the operations comprise:

obtain a certificate of the NTS; and wherein the trusted certificate includes at least the obtained certificate of the NTS and a cryptographic system chosen to communicate with the mobile device over the secure connection.

16. The system of claim 15, wherein the secure connection comprises a transport layer security (TLS) connection.

17. The system of claim 12, wherein the NTS comprises any one of: a web server and an application server.

18. The system of claim 12, wherein at least one of the group consisting of the NTS and at least one of the SRDs is partially or completely deployed in a cloud-computing platform, wherein the cloud-computing platform is at least one of: a public cloud system, a private cloud system, and a hybrid cloud system.

19. The system of claim 12, wherein the system is further configured to generate a performance testing report based on the received information.

20. The system of claim 12, wherein the performance testing report comprises:

an estimated maximum capacity;

if at least one error was received during testing, the at least one error received during testing;

throughput of the NTS; and a response time of the NTS.

* * * * *